United States Patent [19]

Morris et al.

[11] Patent Number: 5,297,778
[45] Date of Patent: Mar. 29, 1994

[54] VALVE DISC AND DRIVE SHAFT ASSEMBLY

[75] Inventors: Michael P. Morris, Birmingham; Phillip J. Haseley, Newport, both of England

[73] Assignee: BTR plc, United Kingdom

[21] Appl. No.: 736

[22] Filed: Jan. 5, 1993

[30] Foreign Application Priority Data

Jan. 8, 1992 [GB] United Kingdom ............ 9200339.1

[51] Int. Cl.[5] .............................................. F16K 1/22
[52] U.S. Cl. .................................... 251/351; 251/308
[58] Field of Search ............................... 251/305, 308

[56] References Cited

U.S. PATENT DOCUMENTS

| | | |
|---|---|---|
| 3,601,360 | 8/1971 | Scaramucci . |
| 3,988,000 | 10/1976 | Reese ......................... 251/305 X |
| 4,376,333 | 3/1983 | Kanamaru et al. . |
| 4,380,246 | 4/1983 | Casale et al. ................ 251/308 X |
| 4,574,448 | 3/1986 | Brandenstein et al. . |
| 4,786,031 | 11/1988 | Waldrop ..................... 251/305 X |

FOREIGN PATENT DOCUMENTS

| | | |
|---|---|---|
| 545829 | 8/1985 | Australia . |
| 0017583 | 10/1980 | European Pat. Off. . |
| 407010 | 2/1934 | United Kingdom . |
| 2180626 | 4/1987 | United Kingdom . |
| 2220728 | 1/1990 | United Kingdom . |
| 2225834 | 6/1990 | United Kingdom . |

*Primary Examiner*—John C. Fox
*Attorney, Agent, or Firm*—Stevens, Davis, Miller & Mosher

[57] ABSTRACT

A butterfly valve disc has a circular cross-section bore for receiving the end of a drive shaft which engages with a member non-rotatably located in the bore. The member is polygonal and preferably formed with twelve sides and edges, the edges biting into the internal surface of the bore to prevent rotation. The member preferably is of harder alloy than the disc to resist wearing and is formed with a slot extending perpendicularly to the plane of the disc to receive a corresponding tongue formed at the end of the shaft. This arrangement allows a small degree of play so that if the disc is subjected to pressure on one side and therefore bends, the torque required to open the valve is not increased. Alternatively wherein the disc (or another component) is not subject to such pressure the member may be integrally formed with the shaft.

12 Claims, 4 Drawing Sheets

VALVE DISC AND DRIVE SHAFT ASSEMBLY

BACKGROUND OF THE INVENTION

This invention relates to a valve disc and drive shaft assembly, particularly for a butterfly valve.

In a known form of butterfly valve, the disc is cast to its general shape and then a diametrically arranged bore is formed by drilling. This bore extends across the whole diameter of the disc, and receives the drive shaft by means of which the disc is rotated to open or close the valve. To prevent the shaft rotating in the bore, one or more pins are provided radially with respect to the shaft axis and inserted through holes in the disc into blind apertures formed in the shaft.

However, it has been found that sometimes the joint between a pin and a disc is not properly formed or becomes damaged and leakage occurs, either through the disc from one side to the other or from the interior to the exterior of the valve, along a leakage path alongside the drive shaft.

One way of avoiding piercing the disc is to use a shaft of non-circular cross-section e.g. square cross-section, in a correspondingly shaped bore. However such bore shapes are relatively difficult and expensive to provide in practice to the required degree of accuracy by relatively simple machining techniques.

SUMMARY OF THE INVENTION

It is an object of the present invention to provide a valve disc and drive shaft assembly with a relatively simple and inexpensive means for non-rotatably securing the disc to the shaft without providing a leakage path.

In accordance with the invention a valve disc and drive shaft assembly comprises a disc formed with a blind bore of circular cross-section extending radially inwardly from the disc periphery, a polygonal cross-section member, preferably having twelve sides and edges, non-rotatably located within the bore and having a non-circular aperture for receiving a correspondingly shaped projection on the end of the shaft, the construction and arrangement being such that a torque applied to the shaft is transmitted to the member and thence to the disc.

In accordance with another aspect of the invention a method of driveably connecting a drive shaft to a valve disc or other component comprises forming a blind bore of circular cross-section to extend radially inwards from the disc periphery, forming a member with a polygonal cross-section outer surface preferably having twelve sides and edges, and a non-circular aperture, non-rotatably locating the member within the bore, forming the end of the shaft with a projection having a shape corresponding to that of the aperture, and locating the projection in the aperture, the assembly so formed being capable of transmitting a torque applied to the shaft, to the member and thence to the disc.

Preferably the edges of the member are regularly spaced around the periphery of the member. The distance across the member between opposite edges is slightly greater than the internal diameter of the bore so that a force has to be applied to insert the member into the bore and, when in position the edges press against the interior surface of the bore. The edges may indent the interior surface and displace or deform the material of the disc.

Preferably the member is made of a material which is of superior strength or hardness compared to the material of the disc and has a higher wear resistance. For example the member may comprise a high strength alloy e.g. hardened stainless steel whereas the disc material has a lower strength or hardness e.g. cast S.G. iron for inexpensiveness, ease of manufacture and/or corrosion resistance.

The member may be formed to have twelve sides and edges each regularly spaced-apart around the periphery of the member. The sides may be flat or concave.

In one form of the invention the end of the shaft is formed with a tongue which extends diametrically, the length of the tongue, measured across the shaft, being slightly less than the diameter of the shaft, and the member is formed with a slot for receiving the tongue, the slot extending across the whole width of the member perpendicularly to the plane of the valve disc. Thus when the valve is closed and one side of the valve disc is subjected to fluid pressure the disc bends or otherwise moves slightly so that the member slides relatively to the tongue. No high bending movements are transmitted from the disc to the shaft so that the valve may be opened readily without the need for a high torque to be applied.

In accordance with a further aspect of the invention a method of drivably connecting a shaft to a component comprises forming a circular cross-section bore in the component, forming the end of the shaft to have a polygonal cross-section, of a size whereby the distance across the shaft between opposite edges is slightly greater than the internal diameter of the bore, applying a force to insert the polygonal cross-section end of the shaft into the bore and cause the edges to press against and possibly indent the interior surface of the bore, the end of the shaft thereby being non-rotatably connected to the component. If the edges indent the interior surface, material of the component can be displaced or deformed.

The end of the shaft may be formed to have twelve sides and edges, each regularly spaced apart around the shaft periphery. The sides may be flat or concave.

The invention also includes an assembly of a shaft and a component formed as aforesaid.

BRIEF DESCRIPTION OF THE DRAWINGS

The invention will now be described by way of example only with reference to the accompany drawings of which.

Figure 1:
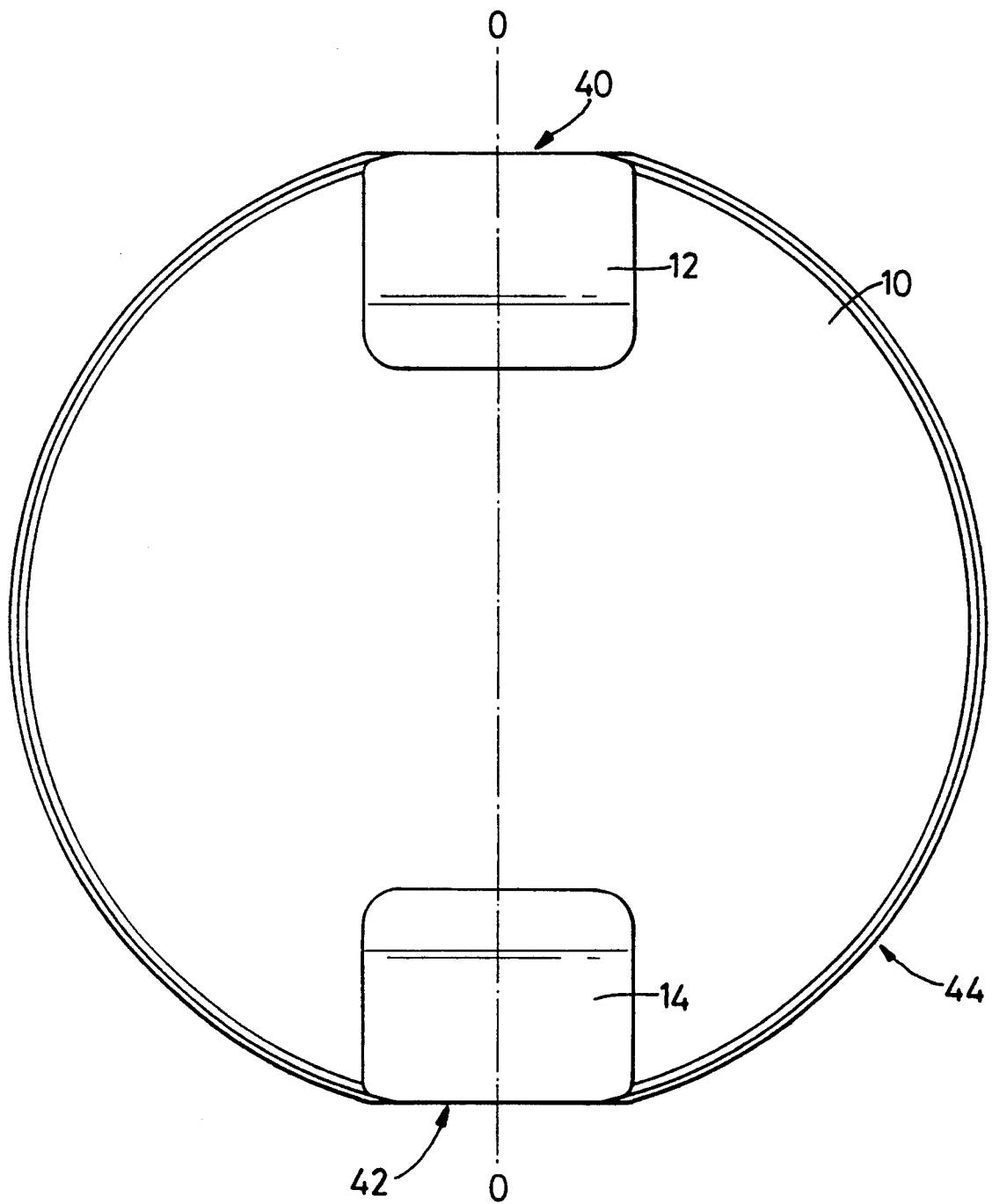
FIG. 1 is a side view of the valve disc of a butterfly valve.

The valve of the present invention shown in the drawings comprises a disc 10, a member 20, and a drive shaft 16.

As shown in FIG. 1 the valve disc 10 of a butterfly valve has an upper socket 12 and a lower socket 14, cast from S.G. iron as a single unit and subsequently machined to its final shape. The disc is supported between an upper drive shaft 16 (partially shown in FIG. 4) and a lower mounting shaft (not shown). The upper drive shaft is housed in a conventional housing in the body of the valve and is provided with seals in a conventional manner. Details are not given nor shown in the drawings as they are not relevent to the present invention. A handle or actuator (not shown) is provided at the upper end of the drive shaft in order that the valve may be opened or closed.

Figure 2:
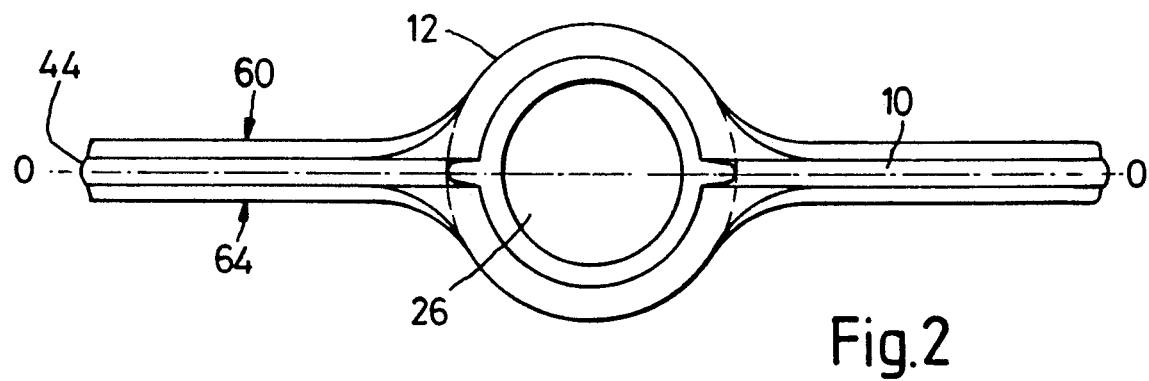
FIG. 2 is a plan view of the valve disc shown in FIG. 1.
Figure 3:
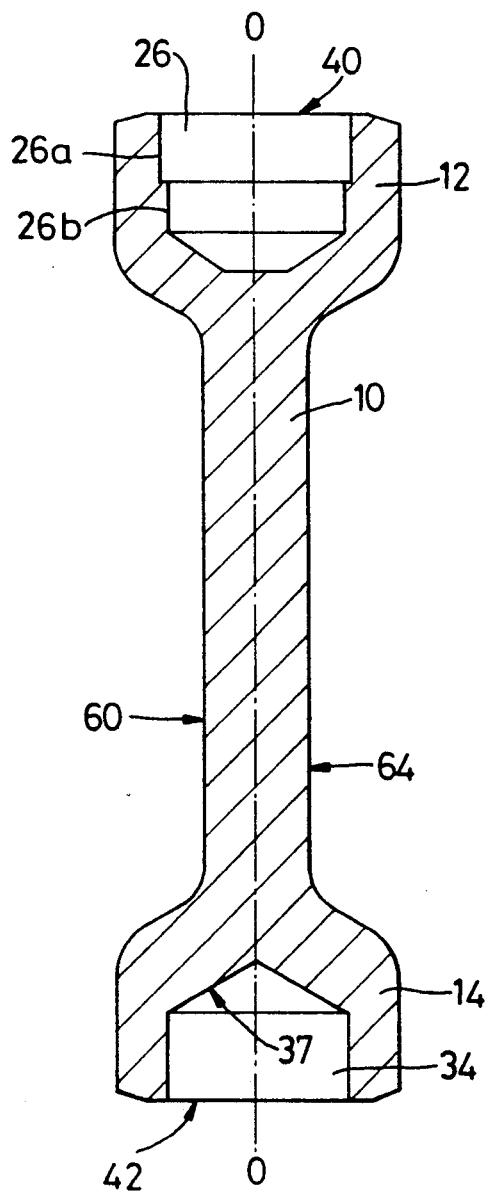
FIG. 3 is a cross-sectional view of the valve disc shown in FIGS. 1 and 2.

The upper socket 12 of the valve disc 10, as can be seen particularly in FIGS. 2 and 3 is provided with a bore 26, accurately machined or drilled to the required size and shape. As shown especially in FIG. 3, the diameter of the outer part 26a of the bore is slightly larger than the inner part 26b. The lower socket 14 is also formed with a bore 34, of constant diameter.

Figure 4:
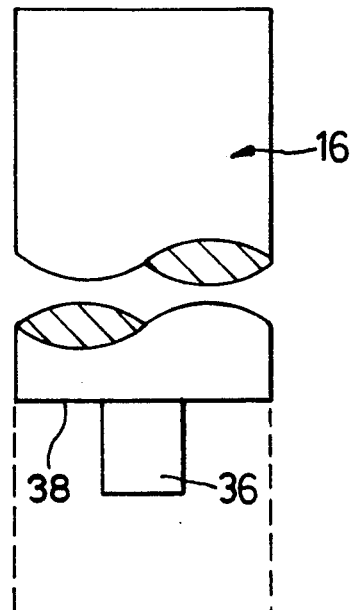
FIG. 4 is an exploded partial side view, partly in cross-section, of the disc, the member and associated drive shaft of the butterfly valve according to the invention.
Figure 5:
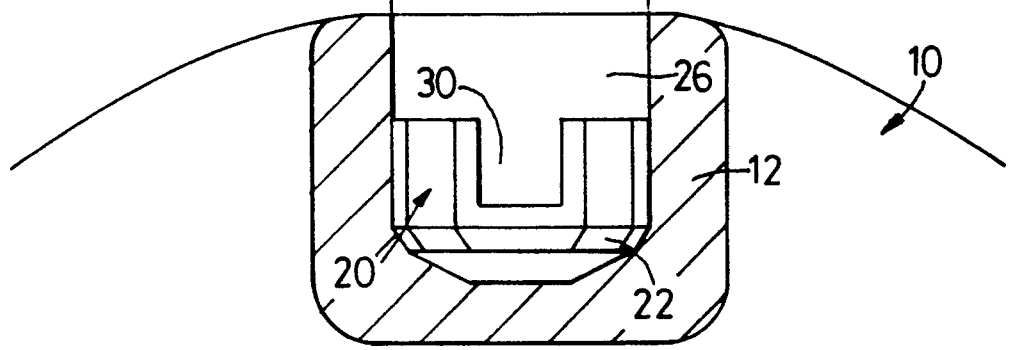
FIG. 5 is a plan view of the member shown in FIG. 4.
Figure 6:
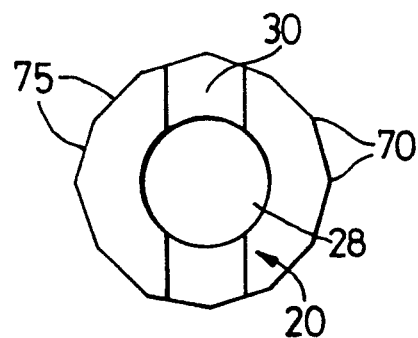
FIG. 6 is an end view of the shaft shown in FIG. 4.
Figure 7:
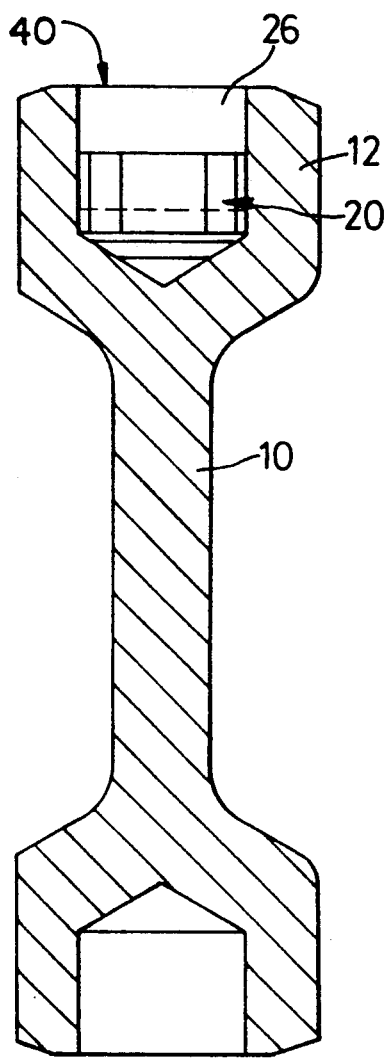
FIG. 7 is a cross-sectional view of the valve disc and member of the butterfly valve according to a modification of the invention.

The member 20, made of hardened stainless steel, of the valve of the first embodiment of the invention, shown in FIGS. 4 and 5, is generally cylindrical and has a chamfered lower edge 22. The length (depth) of the member is approximately equal to half the depth of the bore 26. The member is formed with a central bore 28 extending for the whole length (depth) thereof and a rectangular slot 30 extending across a diameter of the upper surface and having a depth approximately equal to two thirds of the length of the member 20.

Figure 8:
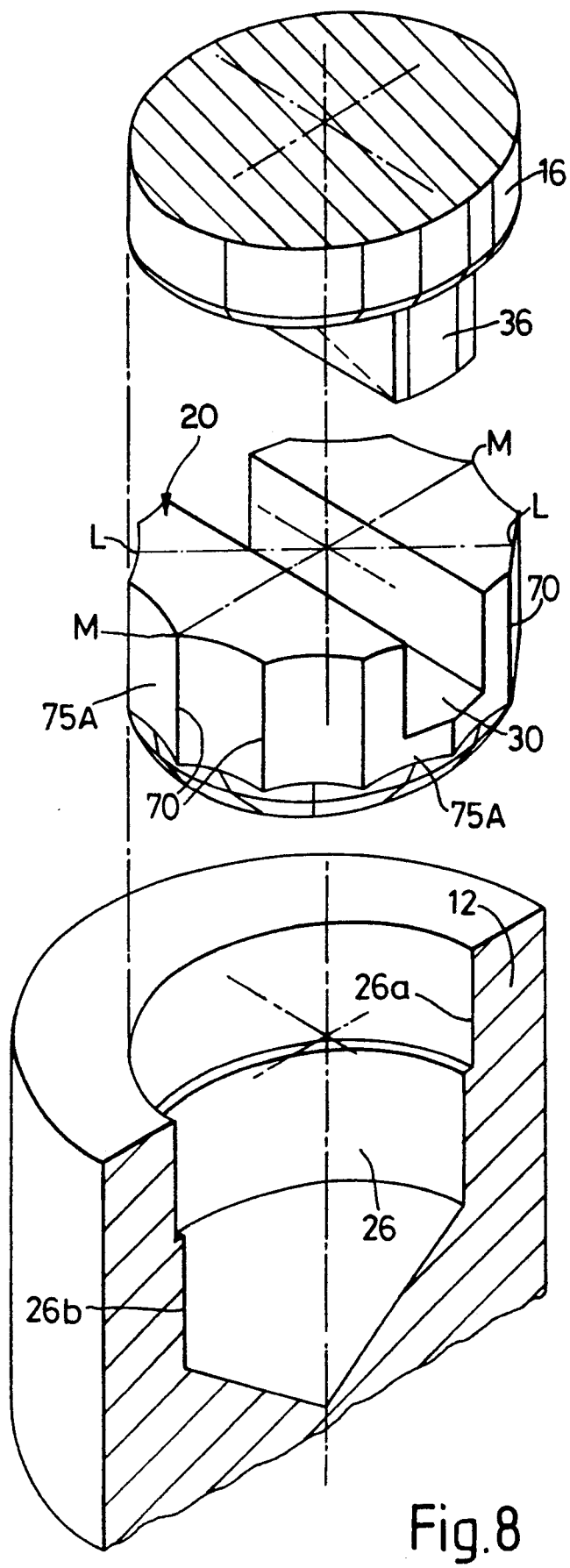
FIG. 8 is an exploded partial perspective view of part of the drive shaft, the member and part of the valve disc of the butterfly valve according to the modification of the invention.

As can be seen particularly in FIG. 5 the member 20 is polygonal in cross-section i.e. having a plurality of flat surfaces 75 and edges 70, the latter extending parallel to one another and to the axis of the member. As shown in FIG. 8 the modified member 20 has twelve concave surfaces 75A and twelve edges 70. The maximum diameter M—M of the member 20, in either FIG. 5 or FIG. 8, measured across the member between two opposite edges, is less than the internal diameter of the outer part 26a of the bore 26 and is greater than the internal diameter of the inner part 26b of the bore 26 in the upper socket 12 of the valve disc 10, and the minimum diameter L—L measured across the member between the two opposite surfaces 75 or 75A is equal to or slightly less than the internal diameter of the inner part 26b of the bore 26. This means that the member 20 is inserted readily into the outer part 26a of the bore 26, and a force has to be applied to locate the member in the inner part 26b where the edges 70 bite into the side of the bore to prevent rotation of the member with respect thereto.

The drive shaft 16 shown in the upper part of FIG. 4 is formed with a tongue 36 extending diametrically across the end face 38 of the shaft. The tongue has a size and shape complementary to the rectangular slot 30 formed in the member 20, but the diametric length of the tongue is slightly less than the diametric length of the slot 30. This allows the tongue 36 to move slightly in the slot 30 if the disc moves or bends under fluid pressure.

The end face 38 of the drive shaft 16 is accurately machined so that it is at right angles to the shaft axis. The shaft locates in the main bore 26 of the upper socket 12 and the shaft axis is in alignment with the axis of the bore 26.

Diametrically opposite the upper socket 12 of the valve disc 10 is a lower socket 14 formed with a bore 34 and having a conical base 37 formed by a drilling operation. This bore 34 formed in the lower socket receives the upper end of the lower supporting shaft (not shown). The lower supporting shaft and the lower socket act as a bearing for the valve disc. The bore 34 in the lower socket 14 and the upper end of the supporting shaft accurately locate the valve disc 10 in the required position in the valve.

Adjacent the upper and lower sockets the periphery of the valve disc is formed with two flat surfaces 40, 42 in a conventional manner and the two generally semi-circular parts of the periphery of the valve disc are machined to have a profiled edge (generally semi-circular in cross-section) as shown particularly at 44 in FIG. 2 to provide sealing engagement with a rubber seal formed within the bore of the valve body (not shown).

When the valve is assembled together the member is positioned inside the bore 26 in the upper socket as described above. The end face 38 of the drive shaft 16 abuts the upper surface of the member and the tongue 36 is accurately positioned within the slot 30. On operation of the valve a torque is applied by the handle or actuator attached to the upper end of the drive shaft 16 and this is transmitted via the tongue 36 to the member 20 and thence via the edges 70 to the valve disc to open or close the valve.

It has been found that particularly for drive shafts of $\frac{1}{2}''$ to 1" (12.5 mm to 25 mm approximately) nominal diameter a member having a regular polygonal cross-section and twelve edges and twelve faces is particularly efficient for transmitting torque from the shaft to the disc and has an acceptable push-in force (see below). It was also found that if the number of edges was increased there was a loss of shear strength on the assembly, and if the number of edges was decreased then the push-in force i.e. the force required to push the member into the inner part of the bore, was increased. These results are illustrated in Table 1 below and were obtained using members having a dimension measured between opposite faces equal to the internal diameter of the bore, and the dimension measured between opposite corners being maintained at a constant value.

TABLE 1

| | |
|---|---|
| Material of shaft | Stainless steel containing 17% Cr and 4% Ni ASTM A 564 Type 630 Tensile Strength 930 MPa Yield Strength 725 MPa |
| Material of member | Stainless Steel containing 17% Cr and 4% Ni ASTM A 564 Type 630 Tensile Strength 930 MPa Yield Strength 725 MPa |
| Material of disc | Spheroidal Graphite Cast Iron Type CEN pr EN TC190/230 gr 400-15 (British Standard 2789 Gr 420-12) Tensile strength 420 MPa Yield strength 270 MPa |
| Diameter of shaft | 25.00 mm |
| Tongue width | 9.00 mm |
| Diameter of bore in disc | 25.05 mm (Outer part) 24.00 mm (Inner part) (P) |
| Distance across opposite faces of member (L-L) | 23.95 mm (12 faces) |
| Distance across opposite | 25.00 mm (12 edges) (Q) |

TABLE 1-continued

| | |
|---|---|
| edges of member (M-M) | |
| Interference (Difference between dimensions P and Q above) | 1.00 mm |

| No of Edges | Push-in Force | Interference | Torque Transmission* |
|---|---|---|---|
| 8 | 18 Ton | 2.44 mm | 1150 Nm |
| 12 | 8 Ton | 1.00 mm | 810 Nm |
| 16 | 3 Ton | 0.46 mm | 505 Nm |
| 24 | 3 Ton | 0.20 mm | 400 Nm** |

*The torque transmission result is the torque required to rotate the member through 2° within the disc bore, the material of the disc yielding while the material of the member remained unaffected. The last result** for 24 edges was the torque required to cause complete failure.

Furthermore it was also found that by modifying the member to make the faces 75A concave (see FIG. 8) to torque transmission was improved (see Table 2 below).

TABLE 2

| | |
|---|---|
| Material of shaft | As Table 1 above |
| Material of member | As Table 1 above |
| Material of disc | Aluminium Bronze British Standard 1400 AB2 Tensile Strength 640 MPa Yield Strength 250 MPa |
| Diameter of shaft | 25.00 mm |
| Tongue width | 9.00 mm |
| Diameter of bore disc | 25.05 mm (outer part) 24.00 mm (Inner Part) (P) |
| Distance across opposite faces of member (L-L) | 23.95 mm (12 flat faces) |
| Distance across opposite edges of member (M-M) | 25.00 mm (12 edges) (Q) |
| Interference (Difference between dimensions Part Q above | 1.00 mm |

| Face | Push-in force | Interference | Torque Transmission φ |
|---|---|---|---|
| Flat | 5 Ton | 1.00 mm | 764 Nm |
| Concave (40 mm diameter of cutter forming face) | 5.5 Ton | 1.47 mm | 815 N |

φThe Torque Transmission result is the torque required to rotate the member through 2° within the inner bore, the material of the disc yielding while the material of the member remains unaffected.

The members 20 described above are made simply and inexpensively by conventional metal machining techniques and provide a simple and effective means for transferring the torque from a drive shaft 16 to a valve disc 10. Since the valve disc is not pierced in any way on either of its main surfaces 60, 64 the likelihood of any leakage occurring from one side of the disc to the other or to the exterior of the valve along the surface of the drive shaft 16 is eliminated.

The invention, in allowing material of superior strength to be used for the torque drive member 20, e.g. a high strength alloy or hardenable stainless steel, means the valve drive components will have a high resistance to wear, and high strength for torque transmittal inside disc member 10, which for purposes of economy or corrosion resistance, will require to be made of a material of much lower strength.

The central aperture 28 also provides a passage to the lower side of the member 20 should the member need to be removed from the bore 26.

A member in accordance with the present invention will find application in other engineering devices where it is required to transmit the torque from, for example, a shaft, to a component in a simple and effective manner. In the embodiment of the invention described the tongue/slot connection is weaker than the member/disc connection, but the assembly allows movement of the disc as a result of fluid pressure applying a force which is radial with respect to the drive shaft. However, in other applications such radial forces will not necessarily be present and thus the tongue/slot connection will not be needed, so the end of the drive shaft may be formed with the same shape as the member, and the drive shaft connected directly to a bore in the component to be driven (rotated). In other words the member is effectively integral with the shaft.

What I claim is:

1. An assembly comprising a valve disc, a drive shaft and a member wherein
   the valve disc has a periphery and is formed with a blind bore of circular cross-section extending radially inwardly of the periphery,
   the member has a polygonal cross-section being formed with a plurality of alternate edges and sides, is non-rotatably located within the blind bore, and has a non-circular cross-section aperture, and
   the shaft is of circular cross-section, is received in the bore and has an end of non-circular cross-sectional shape corresponding to the cross-section of the aperture of the member and is received in said aperture,
   the construction and arrangement of the assembly being such that a torque applied to the shaft is transmitted to the member and thence to the disc.

2. An assembly according to claim 1 wherein the member has twelve edges.

3. An assembly according to claim 1 wherein the member has a periphery and the edges are regularly spaced around the periphery, and the circular cross-section blind bore has an interior surface and an internal diameter, the distance measured across the member between opposite edges being slightly greater than the internal diameter of the bore whereby a force has to be applied to the member to insert the member into the bore and, when positioned in the bore, the edges press against the interior surface of the bore to prevent rotation of the member within the bore.

4. An assembly according to claim 1 wherein the member is made of a first material and the disc is made of a second material, the first material being of superior strength compared to the second material.

5. An assembly according to claim 1 wherein the member comprises a first material and the disc comprises a second material, the first material being of superior hardness compared to the second material.

6. An assembly according to claim 1 wherein the member comprises a first material and the disc comprises a second material, the first material having a higher wear resistance compared to the second material.

7. An assembly according to claim 1 wherein the member has a peripheral edge and the bore has a base further from the periphery of the disc, the peripheral edge of the member being located adjacent the base and being chamfered.

8. An assembly according to claim 1 wherein the sides of the member are flat.

9. An assembly according to claim 1 wherein the sides of the member are concave.

10. An assembly according to claim 1 wherein the bore has an outer part close to the disc periphery, an inner part lying radially inwards of the outer part with respect to the disc periphery, the outer part having a diameter greater than the inner part, and the member is non-rotatably located in the inner part.

11. An assembly according to claim 1 wherein the member is integrally formed with the shaft.

12. An assembly according to claim 1 wherein the non-circular cross-section end of the shaft comprises a tongue which extends diametrically of the shaft, the length of the tongue, measured across the shaft, being slightly less than the diameter of the shaft, and the aperture of the member comprises a slot for receiving the tongue, the slot extending across the whole of the member perpendicularly to the plane of the valve disc.

* * * * *